May 19, 1953 — J. A. ROSS — 2,638,985
IRON SHEAR AND SEPARATOR
Filed March 21, 1951
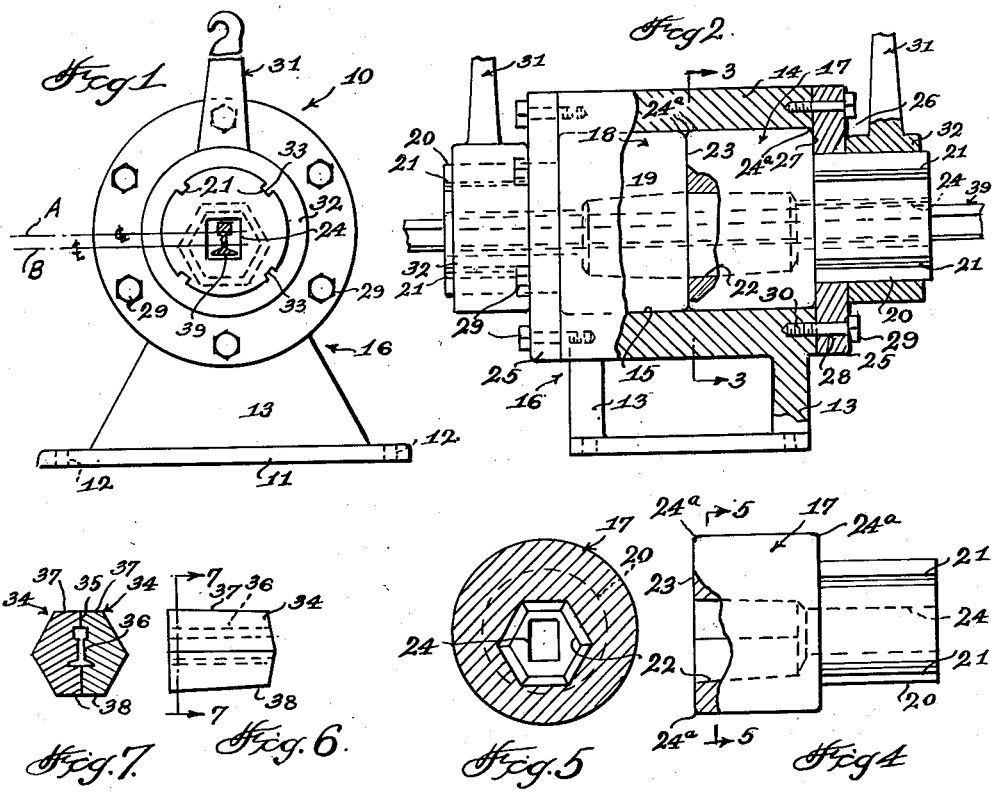
Inventor
JOHN A. ROSS
By John N. Randolph
Attorney Patented May 19, 1953

2,638,985

UNITED STATES PATENT OFFICE 2,638,985

IRON SHEAR AND SEPARATOR

John A. Ross, Klamath Falls, Oreg.

Application March 21, 1951, Serial No. 216,808

3 Claims. (Cl. 164—40)

This invention relates to a novel construction of shear and separator for cutting and separating pieces of metal, particularly iron such as rods, bars, lengths of angle iron, I-beams, railroad rail and the like.

More particularly, it is an aim of the present invention to provide a shear and separator of extremely simple construction equipped with replaceable dies defining openings for engaging the work to be cut and separated and wherein the die openings include portions disposed concentrically of the axis of rotation of the dies and other portions which are eccentrically disposed different distances from said axis of rotation whereby a portion of the work will be divided by a shearing cut while another portion thereof will be separated by a torsional force without being actually subjected to a cutting action.

Another object of the invention is to provide a shear and separator wherein a smooth cut and separation will be made in a piece of work so that the newly formed ends thereof are capable of being employed for joints without other machine operations thereon.

A further object of the invention is to provide a shear and separator which will be extremely efficient and durable for accomplishing its intended purpose, which is composed of a minimum of parts and which is so constructed that the dies thereof may be readily removed and replaced with other dies defining differently shaped openings for accommodating workpieces of different cross sectional shapes.

A further object of the invention is to provide a shear and separator wherein a minimum of torque is required to effect the cutting and separating of the material.

Various other objects and advantages of the invention will hereinafter become more fully apparent from the following description of the drawing, illustrating a presently preferred embodiment thereof, and wherein:

Figure 1 is an end elevational view of the shear and separator;

Figure 2 is a side elevational view, partly in section thereof;

Figure 3 is an enlarged cross sectional view through the shear and separator taken intermediate of its ends and substantially along a plane as indicated by the line 3—3 of Figure 2;

Figure 4 is a side elevational view, partly in section showing one of the chucks removed;

Figure 5 is a cross sectional view thereof taken substantially along a plane as indicated by the line 5—5 of Figure 4;

Figure 6 is a side elevational view of a pair of dies shown removed from the shear and separator;

Figure 7 is a cross sectional view thereof taken substantially along a plane as indicated by the line 7—7 of Figure 6, and Figure 8 is a view similar to Figure 7 but showing a pair of dies defining a differently shaped opening for use with a piece of work of a different cross sectional shape.

Referring more specifically to the drawing, the shear and separator in its entirety is designated generally 10 and includes a base 11 provided with apertures 12 for receiving fastenings, not shown, for securing the base on a suitable supporting surface, not shown, to maintain the shear and separator in a stationary position while in use. The base 11 is provided with integral corresponding upstanding webs 13 at the ends thereof forming legs the upper ends of which are preferably formed integral with portions of an elongated cylinder or sleeve 14 which is disposed with its axis preferably parallel to the plane of the base 11 and which has a bore 15 of uniform diameter extending from end-to-end thereof. The parts 11, 13 and 14 combine to form the frame of the shear and separator, designated generally 16.

The shear and separator 10 includes a pair of corresponding chucks designated generally 17 and 18 of circular cross section externally each including an enlarged end 19 sized to rotatably engage in the bore 15 and a restricted outer end 20 of smaller external diameter than the end 19 and which is provided with a plurality of longitudinally extending key-ways 21 which open outwardly of its outer end. Each chuck is also provided with a die receiving bore 22 formed in its enlarged end portion 19 and which is of noncircular cross section and is preferably provided with an equal number of sides as for example six sides, as illustrated in Figure 5. The die receiving bore 22 extends from the inner face 23 of the chuck portion 19 to a point adjacent the restricted chuck portion 20 and tapers in size from the inner face 23 of the chuck portion 19 to its inner end, as seen in Figures 4 and 5. Each chuck is provided with a restricted bore 24 extending longitudinally thereof through the chuck portion 20 which opens into the restricted end of the bore 22 and outwardly of the outer end of the chuck. The edges or corners of the chucks are rounded, as seen at 24a to prevent the chucks from scarring or marring the surface of the bore 15 or the retaining members 25. A pair of annular retaining members 25 are provided each of which has a bore or opening 26 in which is journaled a part of each chuck portion 20, located adjacent its chuck portion 19, so that the inner portion of each retaining member or ring 25 abuts against the annular shoulder 27 defining the outer end or face of the chuck portion 19 of each chuck, which surrounds the chuck portion 20. The outer portion of each retaining member 25 bears against an end of the sleeve or cylinder 14 and is provided with circumferentially spaced openings 28 for turnably receiving unthreaded portions of the shanks of headed fastenings 29 which are provided with threaded terminals for threadedly engaging longitudinally disposed threaded recesses 30 which are formed in and open outwardly of the ends of the cylinder 14.

The combined lengths of the chuck portions 19 is equal to the length of the cylinder 14 so that when the chuck portions 19 are disposed in the bore 15 and the retaining members 25 are applied and tightened against the ends of the cylinder by tightening the fastenings 29, the faces 23 defining the inner ends of the chuck portions 19 will be disposed in abutting engagement.

The shear and separator 10 includes a pair of corresponding elongated levers 31 each having a collar 32 at one end thereof which is sized to fit over the exposed end of one of the chuck portions 20, outwardly of the retaining member 25 in which said portion is journaled. Each collar 32 is provided with circumferentially spaced inwardly projecting keys 33 which fit the ways 21 for keying the leverage members 31 one to each of the chuck portions 20. Obviously, if desired, the outer parts of the chuck portions 20 which are disposed outwardly of the retaining members 25 may be made non-circular in cross section in lieu of being provided with the key-ways 21 and the collars 32, in lieu of being provided with the keys 33 may be provided with bores of non-circular cross section to fit the outer ends of the chuck portions 20 for keying the leverage members 31 thereto. The key-ways 21 which extend from the outer ends of the chuck portions 20 preferably but not necessarily terminate outwardly of the parts of said chuck portions 20 which are journaled in the openings 26. The collars 32 may be secured on the chuck portions 20 by a press fit engagement or in any other suitable manner.

As best illustrated in Figures 2 to 5, the die receiving bores 22 are disposed eccentrically relatively to the peripheries of the chuck portions 19 and also to the chuck portions 20. Each bore 22 is adapted to receive a pair of dies 34 or 34a each of which is of a length substantially corresponding to the length of the bore 22. The two dies 34 have complementary faces 35 extending from end-to-end thereof which are provided with complementary recesses likewise extending from end-to-end of the dies each of which is of uniform size and shape throughout its length. The recesses of the faces 35 of the dies 34 are so shaped as to form a bore 36 corresponding in shape cross sectionally to a railroad rail when the die faces 35 are disposed in abutting engagement and the top and bottom surfaces 37 and 38, disposed above and beneath the bore 36, are positioned in flush relationship. When the pair of dies 34 are thus disposed with their upper surfaces 37 and their lower surfaces 38 in flush relationship, as illustrated in Figure 7, the pair of dies 34 forms a six-sided body of the same cross sectional shape as each bore 22. As illustrated in Figure 6, the dies 34 are likewise tapered uniformly from end-to-end thereof corresponding to the taper of the bores 22 in which the pairs of dies are sized to snugly fit. The dies 34a differ from the dies 34 only in that the faces 35a thereof are provided with differently shaped recesses which combine to form a bore of L-shaped cross section, designated 36a when the pair of dies 34a are assembled as illustrated in Figure 8 for snugly fitting a length of angle iron, not shown. It will likewise be readily apparent that other pairs of dies may be provided having recesses of other shapes to form various shaped bores for receiving other material of different cross sectional shapes as for example, bars and rods of circular and non-circular shape, I-beams etc.

It is to be understood that a pair of dies 34 or 34a is accommodated in the bore 22 of each chuck and the pair of dies employed with the two chucks always correspond. To apply the two pair of dies 34 to the chucks 17 and 18, the fastenings 29 of one of the retaining members 25 are removed so that the chuck held thereby and the leverage member 31 connected thereto may be detached from the cylinder or sleeve 14 with said retaining member 25. One pair of dies 34, assembled as illustrated in Figures 6 and 7, may then be inserted with the small ends of the dies foremost into the open end of the sleeve 14 and into the bore 22 of the other chuck. A second pair of assembled dies 34 is then inserted with the small ends of the dies foremost into the bore 22 of the chuck which is removed from the frame 16, entering the bore 22 through its enlarged end and so that each pair of dies 34 will be disposed in the chucks, as illustrated in Figure 3. The die bores 36 register with the chuck bores 24 so that a length of railroad rail 39 may be inserted longitudinally through the bores 24 and 36 of the chucks 17 and 18 and the two pairs of dies 34, after said bores 36 have been positioned in alignment. As seen in Figures 1 and 3, the bores 22 and 24 are offset with respect to the axis of the chucks 17 and 18 and the sleeve 14, as indicated by the point A, so that the axes of the two pairs of dies 34 is located at the point B, spaced a substantial distance radially from the axis A, so that it will be readily apparent that portions of the bores 36 will travel at different speeds when the chucks are revolved. It will be noted that the axis A of the chucks 17 and 18 and sleeve 14 extends through the portions of the bores 36 which accommodate the head of the rail 39 when both bores 22 are in the positions of Figures 1 and 3 so that the rail head will have very little movement when the chucks are revolved whereas the base of the rail will describe a circle of a relatively large diameter. The leverage members 31 are preferably applied so as to be in alignment and in upstanding relationship when the chuck bores 22 are in their positions of Figures 1 and 3. Assuming that a supporting surface, not shown, on which the base 11 is secured does not extend beyond the remote sides of the retaining members 25, it will be readily apparent that the leverage members 31 may be rotated through a complete circle and it is to be understood that said leverage members are revolved simultaneously in opposite directions. Accordingly, the pair of dies 34 in one chuck will turn about axis A in one direction while the pair of dies 34 nested in the other chuck will turn about axis A in the opposite direction each relatively to the axis A of the chucks 17 and 18. In the initial stages of this rotary movement of the dies, the rail 39 will be securely clamped if not initially held securely in the bores 36. As the base portion of the rail 39 will move more rapidly than the head portion when the chucks are revolved, initial movement of the chucks in opposite directions will cause the base portion and web portion of the rail 39 to be sheared, this shearing action being to a greater extent adjacent the base portion than the web portion due to the greater distance between the base portion and the axis A, so that less torsional force or leverage will be required on the outer free ends of the leverage members 31 to accomplish this shearing action since the shearing of the base of the rail will be accomplished before the shearing of the web thereof as the portions of the bores 36 of the pairs of dies 34 move in opposite directions away from one another from their positions of Figures 1 and 3. A slower shearing action of the head portion of the rail 39 will be accomplished since said head portion is disposed nearer the axis A. As a part of the bores, which accommodate the head portion of the rail, which is disposed in alignment with the axis A and adjacent thereto do not move out of registration while the pairs of dies are each completing a complete circle, the portion of the rail head engaging said bore portions will not be sheared but will be separated by the torsional force exerted thereon by movement of the two pairs of dies eccentrically in opposite directions relatively to one another so that said portion of the rail head will be separated without actually being cut or sheared.

The pairs of dies 34 are sized to seat snugly in the die receiving bores 22 so that the enlarged ends of the pairs of dies will be in abutting engagement flush with the abutting chuck faces 23 to provide a clean cut and separation of the rail 39 through the portion thereof which aligns with the chuck faces 23. Additionally, this abutting engagement of the enlarged ends of the pairs of dies insures the retention of the pairs of dies in fully seated positions in the bores 22 and eliminates the need for otherwise fastening the dies in the chucks 17 and 18. By constructing the dies 34 and chucks 17 and 18 as previously described so that portions of the die bores 36 will move out of registration at different speeds when the chucks are revolved, it will be readily apparent that less torsional force is required to produce a severing of the work 37 than if the die bores were spaced from the axis of rotation of the chucks so as to merely pass one another in their arcuate travel. Accordingly, by increasing the distance between the axis A of the chucks 17 and 18 and the axis B of the dies 34 the amount of torque required to sever any particular piece of work may be reduced.

It will likewise be readily apparent that one of the leverage members 31 may be held stationary while the other leverage member 31 is revolved for executing the cutting and separating operation but with less efficiency than when both chucks are revolved at substantially uniform speeds in opposite directions. The chuck bores 24 are sized to receive workpieces of different cross sectional shapes such as those shaped to fit the bores of dies 34 or 34a or workpieces shaped to fit die bores of other shapes.

Various modifications and changes are contemplated and may obviously be resorted to, without departing from the spirit or scope of the invention as hereinafter defined by the appended claims.

I claim as my invention:

1. An iron shear and separator comprising a stationary frame including an elongated sleeve, a pair of corresponding chucks having adjacent end portions journaled in said sleeve including adjacently disposed flat end faces, said chucks including restricted remote end portions projecting from the ends of said sleeve, retaining members engaging loosely around parts of the restricted remote end portions of the chucks and detachably secured to the ends of the sleeve, said retaining members having inner portions abutting against the shoulders of the enlarged ends of the chucks surrounding said restricted remote ends of the chucks and retaining the adjacent faces of the chucks in abutting engagement, leverage members fixed to the restricted end portions of the chucks beyond said retaining members and extending radially therefrom for revolving the chucks in the sleeve, a pair of dies nonrotatably disposed in each chuck have a bore of noncircular cross section extending longitudinally therethrough for receiving a workpiece, the axis of the bores of each pair of dies being radially spaced from the axis of the chucks, portions of the bores of the pairs of dies being disposed in alignment with the axis of the chucks and other portions of said bores being radially spaced from the axis of the chucks whereby a workpiece engaging the bores of the pairs of dies of both chucks will be separated in the plane of the abutting faces of the chucks by a shearing and twisting force upon relative rotation of the chucks in the sleeve.

2. An iron shear and separator comprising a stationary frame including an elongated sleeve, a pair of corresponding chucks having adjacent end portions journaled in said sleeve including adjacently disposed flat end faces, said chucks including restricted remote end portions projecting from the ends of said sleeve, retaining members engaging loosely around parts of the restricted remote end portions of the chucks and detachably secured to the ends of the sleeve, said retaining members having inner portions abutting against the shoulders of the enlarged ends of the chucks surrounding said restricted remote ends of the chucks and retaining the adjacent faces of the chucks in abutting engagement, leverage members fixed to the restricted end portions of the chucks beyond said retaining members and extending radially therefrom for revolving the chucks in the sleeve, a pair of dies nonrotatably disposed in each chuck having a bore extending longitudinally therethrough for receiving a workpiece, the axis of the bores of each pair of dies being radially spaced from the axis of the chucks, portions of the bores of the dies being disposed in alignment with the axis of the chucks and other portions of said bores being radially spaced from the axis of the chucks whereby a workpiece engaging the bores of the dies of both chucks will be separated in the plane of the abutting faces of the chucks by a shearing and twisting force upon relative rotation of the chucks in the sleeve, a pair of said dies being removably seated in each chuck, each chuck having an eccentric longitudinally extending bore of noncircular cross section extending from end-to-end thereof in which a pair of the dies are snugly received, said pairs of dies being uniformly tapered, each chuck bore having a portion formed in the enlarged inner end of the chuck which is uniformly tapered toward the outer restricted end of the chuck, the enlarged ends of the pairs of dies corresponding to the enlarged ends of the chuck bores whereby the enlarged ends of the pairs of dies will be disposed in abutting engagement and in alignment with the abutting inner faces of the chucks.

3. An iron shear and separator as in claim 2, said leverage members being turnable in opposite directions whereby the dies carried by each chuck will revolve about the axis of the chucks in opposite directions for movement of the die bores into and out of full registration.

JOHN A. ROSS.

References Cited in the file of this patent

UNITED STATES PATENTS

| Number | Name | Date |
|---|---|---|
| 82,886 | Snell et al. | Oct. 6, 1868 |
| 260,173 | Durfee | June 27, 1882 |
| 975,112 | Bilcsik | Nov. 8, 1910 |
| 1,497,676 | Fink | June 17, 1924 |

FOREIGN PATENTS

| Number | Country | Date |
|---|---|---|
| 147,479 | Germany | Jan. 8, 1904 |
| 49,651 | Switzerland | Feb. 18, 1910 |